US 11,124,696 B2

(12) United States Patent
Khamatnurova et al.

(10) Patent No.: US 11,124,696 B2
(45) Date of Patent: Sep. 21, 2021

(54) SYSTEM AND METHODS FOR DELIVERY OF MULTIPLE HIGHLY INTERACTIVE STIMULATION TREATMENTS IN SINGLE DOSE AND SINGLE PUMPING STAGE

(71) Applicant: Halliburton Energy Services, Inc., Houston, TX (US)

(72) Inventors: Tatyana V. Khamatnurova, Houston, TX (US); Jody Marie Burks, Spring, TX (US); Ali Alwattari, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 116 days.

(21) Appl. No.: 15/770,675

(22) PCT Filed: Nov. 24, 2015

(86) PCT No.: PCT/US2015/062474
§ 371 (c)(1),
(2) Date: Apr. 24, 2018

(87) PCT Pub. No.: WO2017/091216
PCT Pub. Date: Jun. 1, 2017

(65) Prior Publication Data
US 2018/0282615 A1    Oct. 4, 2018

(51) Int. Cl.
*C09K 8/80* (2006.01)
*C09K 8/60* (2006.01)
(Continued)

(52) U.S. Cl.
CPC .......... *C09K 8/80* (2013.01); *C09K 8/52* (2013.01); *C09K 8/54* (2013.01); *C09K 8/602* (2013.01);
(Continued)

(58) Field of Classification Search
CPC ...................................................... E21B 43/25
See application file for complete search history.

(56) References Cited

U.S. PATENT DOCUMENTS 5,910,467 A    6/1999  Bragg
5,964,906 A *  10/1999  Layrisse .............. C10L 1/328
                                                        44/301
(Continued)

FOREIGN PATENT DOCUMENTS

WO        2014114538 A1    7/2014

OTHER PUBLICATIONS

PCT International Search Report and Written Opinion dated Aug. 24, 2016, issued in corresponding application No. PCT/US2015/062474 filed on Nov. 24, 2015, 10 pgs.
(Continued)

*Primary Examiner* — William D Hutton, Jr.
*Assistant Examiner* — Avi T Skaist
(74) *Attorney, Agent, or Firm* — Chamberlain Hrdlicka (57) ABSTRACT

The present disclosure generally relates to a system and methods for stimulation with particle-stabilized emulsion treatment fluids during hydraulic fracturing operations. A treatment fluid is disclosed, the treatment fluid including a continuous fluid phase, a dispersed fluid phase dispersed throughout the continuous fluid phase, a surfactant, and a plurality of solid particles adsorbed to an interface between the continuous and dispersed fluid phases thereby stabilizing the dispersed fluid phase in the continuous fluid phase. A method for treating a subterranean formation is disclosed, the method including providing a treating fluid comprising a plurality of solid particles adsorbed to an interface between a continuous fluid phase and a dispersed fluid phase, thereby stabilizing the continuous and dispersed fluid phases, and pumping the treating fluid under pressure via a pump to
(Continued)

invert the emulsion so that at least a portion of the solid particles are deposited in the subterranean formation.

16 Claims, 3 Drawing Sheets

(51) Int. Cl.
| | |
|---|---|
| *C09K 8/70* | (2006.01) |
| *C09K 8/92* | (2006.01) |
| *C09K 8/66* | (2006.01) |
| *C09K 8/84* | (2006.01) |
| *C09K 8/74* | (2006.01) |
| *C09K 8/52* | (2006.01) |
| *C09K 8/54* | (2006.01) |
| *C09K 8/68* | (2006.01) |
| *C09K 8/72* | (2006.01) |
| *E21B 37/06* | (2006.01) |
| *E21B 43/267* | (2006.01) |

(52) U.S. Cl.
CPC ............... *C09K 8/605* (2013.01); *C09K 8/66* (2013.01); *C09K 8/68* (2013.01); *C09K 8/685* (2013.01); *C09K 8/70* (2013.01); *C09K 8/72* (2013.01); *C09K 8/74* (2013.01); *C09K 8/84* (2013.01); *C09K 8/92* (2013.01); *E21B 37/06* (2013.01); *E21B 43/267* (2013.01); *C09K 2208/08* (2013.01); *C09K 2208/10* (2013.01); *C09K 2208/28* (2013.01); *C09K 2208/32* (2013.01)

(56) References Cited

U.S. PATENT DOCUMENTS

| | | | |
|---|---|---|---|
| 8,916,508 | B2 | 12/2014 | Parnelli et al. |
| 2009/0288820 | A1* | 11/2009 | Barron ................ B01J 13/02 |
| | | | 166/249 |
| 2012/0067575 | A1 | 3/2012 | Luyster et al. |
| 2012/0181029 | A1 | 7/2012 | Saini et al. |
| 2015/0027699 | A1 | 1/2015 | Loiseau et al. |

OTHER PUBLICATIONS

Agarwal, S. et al., "Nanoparticle Stabilised Invert Emulsion Drilling Fluids For Deep Hole Drilling of Oil and Gas" The Canadian Journal of Chemical Engineering, 2013, vol. 91, No. 10, pp. 1641-1649.

* cited by examiner

SYSTEM AND METHODS FOR DELIVERY OF MULTIPLE HIGHLY INTERACTIVE STIMULATION TREATMENTS IN SINGLE DOSE AND SINGLE PUMPING STAGE

BACKGROUND

This section is intended to introduce the reader to various aspects of art that may be related to various aspects of the presently described embodiments. This discussion is believed to be helpful in providing background information to facilitate a better understanding of the present embodiments. Accordingly, it should be understood that these statements are to be read in this light, and not as admissions of prior art.

The present disclosure generally relates to a system and methods for fracturing subterranean formations, and more specifically, to a system and methods for stimulation with particle-stabilized emulsion treatment fluids used in hydraulic fracturing operations.

It is common practice to treat a subterranean formation to increase the permeability or conductivity of the formation. These procedures are identified generally as fracturing operations. For example, it is a conventional practice to hydraulically fracture a well in order to produce one or more cracks or "fractures" in the surrounding formation by mechanical breakdown of the formation.

Hydraulic fracturing may be carried out in wells which are completed in subterranean formations for virtually any purpose. The usual candidates for hydraulic fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a treating fluid, sometimes referred to as a "fracturing fluid," into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Typically, the primary component of a fracturing fluid is water. In addition to water, a fracturing fluid can contain one or more additives to facilitate formation fracturing.

Usually a gel, an emulsion, or a foam, having a proppant such as sand or other particulate material suspended therein, is carried in the fracturing fluid and introduced into the fracture. The proppant is deposited in the fracture and functions to hold the fracture open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a gelation agent and/or an emulsifier is used to gel or emulsify the fracturing fluid to provide the high viscosity needed to realize the maximum benefits from the fracturing process. Where an emulsion is utilized, an emulsion-stabilizing surfactant is typically included to maintain the chemical stability of the additives in the fracturing fluid, particularly at high temperature and pressure conditions downhole.

Practical and cost considerations for hydraulic fracturing operations require the use of additives to reduce the required pumping pressure. This can be accomplished by introducing additives that reduce the frictional drag of the fracturing fluid against the well tubulars, which serve as a conduit for the fluid into the formation. These additives can be dispersed in the fracturing fluid in an emulsion. High-molecular weight, long-polymer chain polymers are widely used as friction reducing additives, or "friction reducers," to this end. A non-limiting example of such polymers are polyacrylamide-based polymers. The long chain, high molecular weight polymers work by reducing the turbulent flow regime in the fracturing fluid into laminar flow. Laminar flow results in lower frictional drag and pressure buildup compared to turbulent flow. In this way, these polymers reduce turbulence and backpressure from friction within the well tubulars, thereby reducing pressure pump power demands.

Other, non-limiting, categories of fracturing fluid additives include biocides to prevent microorganism growth and to reduce biofouling of the fractures, corrosion inhibitors to prevent corrosion of metal pipes, scale inhibitors to prevent mineral scale formation as the fracturing fluid mixes with formation water or after dissolving existing mineral salts in the reservoir, acids to remove drilling mud damage within the near-wellbore area, crosslinking agents to increase fluid viscosity to deliver proppant into the formation, surfactants to reduce interfacial tension in the subterranean formation and to promote more robust water recovery after hydraulic fracturing, and the like. These additives can be dispersed in the fracturing fluid in an emulsion. Any other additives well-known in the art and suitable for well treatment purposes are also envisioned.

When conducting hydraulic fracturing operations, a key concern is delivering the hydraulic fluid including additives deep into fractures in the subterranean formations. Another concern when conveying additives in emulsion is maintaining the chemical stability of the emulsion (i.e., not losing additives during pumping downhole). Accordingly, a system and method for delivering additives deeper into fractures and maintaining the chemical stability of the hydraulic fracturing fluid is desirable.

BRIEF DESCRIPTION OF THE DRAWINGS

For a more detailed description of the embodiments, reference will now be made to the following accompanying drawings.

The illustrated figures are only exemplary and are not intended to assert or imply any limitation with regard to the environment, design, or process in which different embodiments may be implemented.

DETAILED DESCRIPTION OF ILLUSTRATIVE EMBODIMENTS

The system and methods of this disclosure provide means for the delivery of multiple highly interactive subterranean formation stimulation treatments in a single treating fluid system and via a single pumping stage. The treating fluid system may comprise water, either fresh water or water comprising salt. The disclosed systems and methods reduce surface complexity, decrease treating fluid additive losses during pumping, increase treating fluid stability, and increase proppant delivery to the subterranean formation, leading to increased formation permeability.

Generally, the disclosed system and methods comprise a treating fluid formed comprising one or more additives in an emulsion carried in a continuous liquid phase to be delivered to a subterranean formation. The emulsion is a particle-stabilized emulsion in which solid particles adsorb to the liquid-liquid interface between the phases of the emulsion, thereby stabilizing the emulsion.

Figure 1:
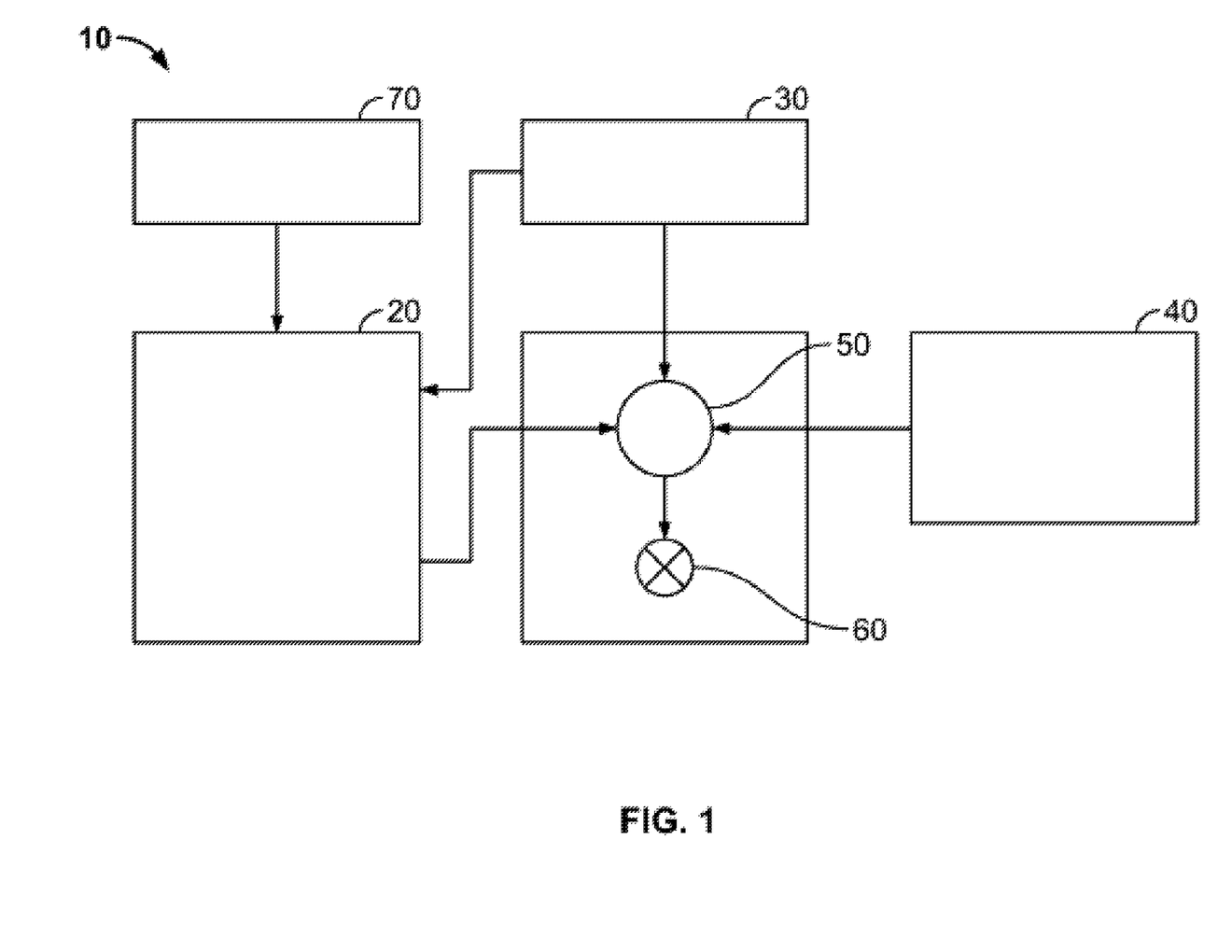
FIG. 1 shows a schematic of a hydraulic fracturing system for a well.

FIG. 1 is one example of a fracture stimulation system 10 in accordance with the disclosure. In certain instances, the system 10 includes a fracturing gel producing apparatus 20, a fluid source 30, a proppant source 40, and a pump and blender system 50 and resides at a surface well 60 site. In certain instances, the gel producing apparatus 20 combines a gel pre-cursor with fluid (e.g., liquid or substantially liquid) from fluid source 30, to produce a hydrated fracturing gel that is used as a fracturing fluid. The hydrated fracturing gel can be a gel for ready use in a fracture stimulation treatment of the well 60 or a gel concentrate to which additional fluid is added prior to use in a fracture stimulation of the well 60. In other instances, the fracturing gel producing apparatus 20 can be omitted and the fracturing fluid sourced directly from the fluid source 30. In certain instances, the fracturing fluid can include water, a hydrocarbon fluid, a polymer gel, foam, air, wet gases and/or other fluids.

The proppant source 40 can include a pre-made proppant for combination with the fracturing fluid and/or, as discussed in more detail below, the proppant source 40 can include a source of proppant pre-cursor. The proppant pre-cursor is a composition that generates the proppant after being combined with the fracturing fluid (i.e., in the wellbore and/or in the fractures of the subterranean zone). In certain instances, the proppant source 40 can additionally include a source of an activator for the proppant pre-cursor that activates the proppant pre-cursor to generate the proppant.

The system may also include various other additives 70 to alter the properties of the mixture. For example, the other additives 70 can be included to reduce pumping friction, to reduce or eliminate the mixture's reaction to the geological formation in which the well is formed, to operate as surfactants, and/or to serve other functions.

The pump and blender system 50 receives the fracturing fluid and combines it with other components, including proppant or proppant pre-cursor (and in some instances, the activator) from the proppant source 40 and/or additional fluid from the additives 70. The resulting mixture may be pumped down the well 60 under pressure to fracture stimulate a subterranean zone (i.e., produce fractures), for example to enhance production of resources from the zone. In instances using an activator, the activator can be combined with the proppant pre-cursor at the pump and blender system 50 and/or injected down the well 60 at another time. Notably, in certain instances, different sources of fluids are valved to the pumping and blender system 50 so that the pumping and blender system 50 can source from one, some or all of the difference sources of fluid at a given time. Thus, for example, the pumping and blender system 50 can provide just fracturing fluid into the well at some times, just proppant pre-cursor and/or activator at other times, and combinations of the fluids at yet other times.

Figure 2:
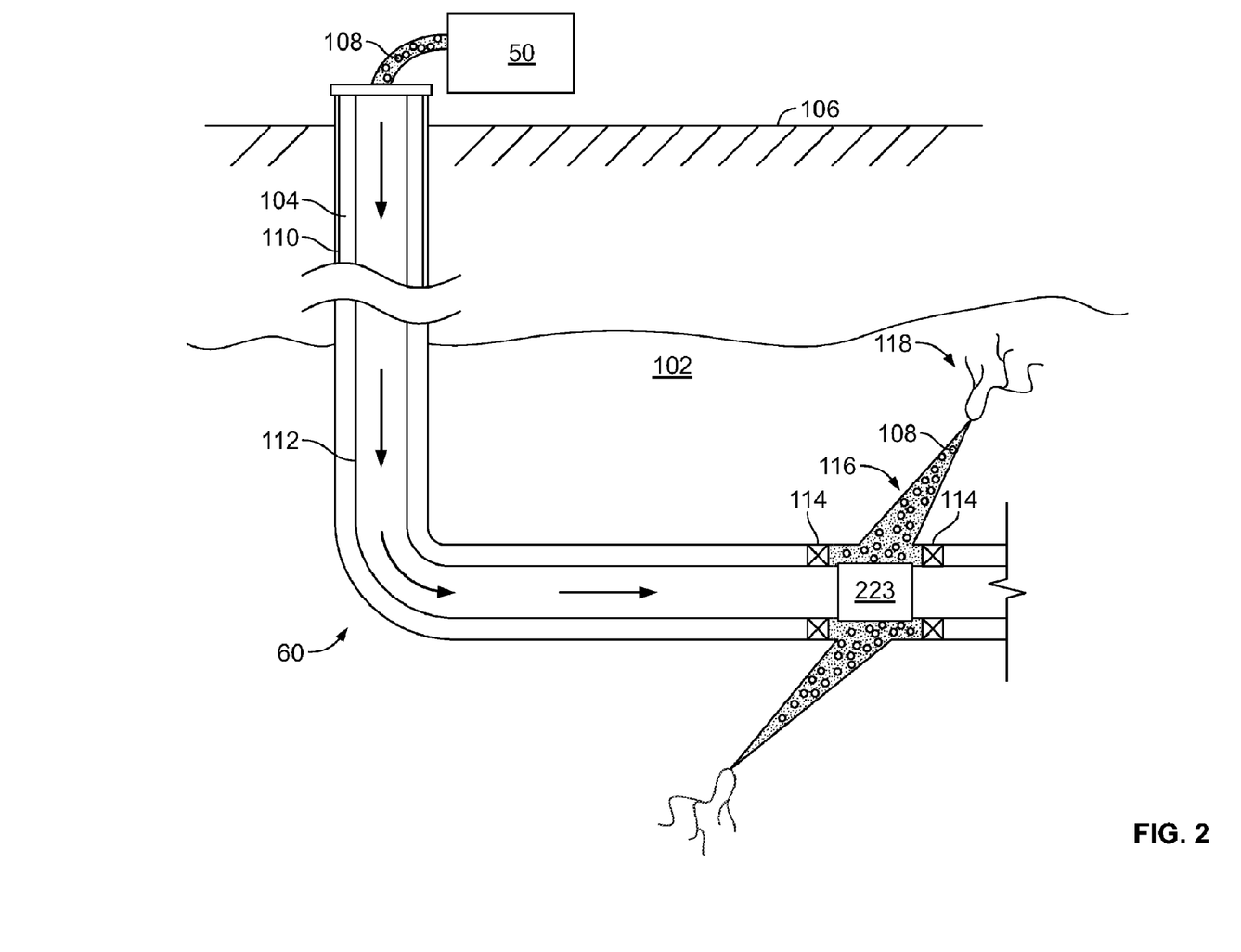
FIG. 2 shows a schematic side view of a well system during hydraulic fracturing operations.

FIG. 2 shows the well 60 during a fracture treatment of a subterranean zone of interest 102 surrounding a wellbore 104. The subterranean zone 102 can include one or more subterranean formations or a portion of a subterranean formation.

The wellbore 104 extends from the surface 106, and the fracturing fluid 108 is applied to the subterranean zone 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean zone 102. In cased wells, perforations can be formed using shape charges, a perforating gun, hydrojetting and/or other tools.

The well is shown with a work string 112 depending from the surface 106 into the wellbore 104. The pump and blender system 60 is coupled a work string 112 to communicate the fracturing fluid 108 into the wellbore 104. The working string 112 may include coiled tubing, jointed pipe, and/or other structures that communicate fluid through the wellbore 104. The working string 112 can include flow control devices 223 (e.g., bypass valves, ports, and or other tools or well devices) that control a flow of fluid from the interior of the working string 112 into the subterranean zone 102. For example, the working string 112 may include ports adjacent the wellbore wall to communicate the fracturing fluid 108 directly into the subterranean zone 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 includes one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval.

The rock matrix of the subterranean zone 102 is of a type that when fractured, produces both a primary fracture 116 in the near field and secondary, induced, dendritic fractures 118 in the far field. The secondary fractures 118 have propagated from or near the ends and edges of the primary fracture 116. In certain instances, the subterranean zone 102 is a low permeability zone having a permeability of 1 mD or less. For example, the subterranean zone 102 can be shale. In certain instances, the rock matrix of the subterranean zone 102 may include cleating or natural fractures (i.e., those that existed prior to, and were not caused by, a fracture treatment). The natural fractures tend to run generally in a direction that is parallel to the primary fracture 116. The secondary fractures 118 run in many directions including directions non-parallel and, in certain instances, perpendicular to the direction of the primary fracture 116. As a result, the secondary fracture 118 can cross, and thereby link, the natural fractures to the primary fracture 116. The treating fluid system of the present disclosure can be pumped downhole to form and penetrate fractures of a subterranean formation, such as primary fractures 116 and secondary fractures 118.

Figure 3:
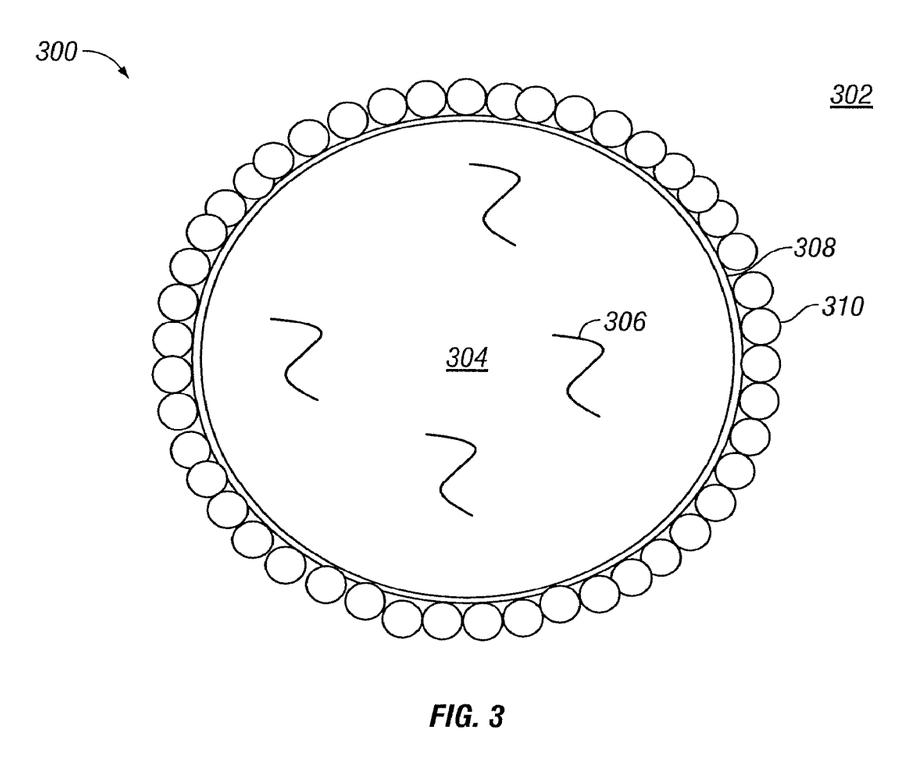
FIG. 3 shows a schematic illustration of a treating fluid system according to the present disclosure.

Referring now to FIG. 3, a schematic illustration of a treating fluid system according to the present disclosure is shown for illustrative purposes. As illustrated, the system includes a particle-stabilized emulsion 300 comprising two immiscible fluids, i.e., a continuous phase 302 and a dispersed phase 304. The continuous phase 302 can comprise any carrier fluid, such as water. The water may comprise either fresh water or water comprising salt. The dispersed phase 304 can comprise one or more hydrophobic additives 306 to facilitate formation fracturing during hydraulic fracturing operations. The dispersed phase 304 can further comprise a liquid or a gas. Where the dispersed phase 304 is a gas (e.g., nitrogen, carbon dioxide, methane, etc.), the treating fluid system can be described as a foam. The continuous phase 302 and the dispersed phase 304 may comprise reactive and/or non-reactive components.

Dispersed phase 304 can comprise friction reducers for reducing fluid drag during pumping, such as a high-molecular weight, long chain polymer (e.g., anionic polyacrylamide-based polymers), biocides to prevent microorganism growth and to reduce biofouling of the fractures, corrosion inhibitors to prevent corrosion of metal pipes, scale inhibitors to prevent mineral scale formation as the fracturing fluid mixes with formation water or after dissolving existing mineral salts in the reservoir, acids to remove drilling mud damage within the near-wellbore area, crosslinking agents to increase fluid viscosity to deliver proppant into the formation, surfactants to reduce interfacial tension in the subterranean formation and to promote more robust water recovery after hydraulic fracturing, and the like.

With traditional treating fluids comprising an emulsified material or materials, a surfactant is used to chemically stabilize the emulsion. According to the present disclosure, a surfactant 308 can optionally be included to chemically stabilize the emulsion. However, surfactant 308 is not a necessary component of the disclosed treating fluids. Solid particles 310 are used to physically stabilize the emulsion. The solid particles 310 adsorb or bind to the surface of an interface between the continuous phase and the dispersed phase, i.e., a liquid-liquid interface when each phase comprises a liquid, or a gas-liquid interface when the dispersed phase comprises a gas, upon being introduced into the treating fluid. The solid particles 310 stabilize the emulsion 300, together with the surfactant 308 when surfactant 308 is included in the treating fluid, by acting as a shell surrounding the dispersed phase 304, thereby preventing the dispersed phase 304 from coalescing and/or settling.

Since the emulsion 300 is physically stabilized, in whole or in part, the emulsion 300 and ultimately the entire treating fluid the emulsion is dispersed within requires less or no surfactant to hold the dispersed 304 phase in the aqueous phase 302. As a result, the cost of the treating fluid is dramatically decreased. In addition, the time-consuming task of customized design and selection of an appropriate surfactant is reduced or eliminated.

The emulsion 300 can be broken by applying an external stimulus to the treating fluid once the desired location in the subterranean formation is reached. Such external stimulus can include, for instance, pressure supplied from a pump located at the surface of the subterranean formation. When the emulsion 300 is broken, the solid particles 310 stabilizing the emulsion can be left in the subterranean formation to prop open fractures, such as fractures 116 and 118 illustrated in FIG. 2. In addition, the additives 306 can be released into the subterranean formation to achieved desired results.

According to the present disclosure, the solid particles 310 can include particles configured to prop open fractures in the subterranean formation. The solid particles 310 can be organically or inorganically derived. Non-limiting examples of such particles include mica, silica, titanium, crystalline nanocellulose, colloidal borosilicate, colloidal zirconium oxide, colloidal aluminum oxide, microgels such as polyalumosilicate microgels, food-based particulates, carbon nanotube particles, carbon nanofiber and carbon nanobeads, polymer micro beads, and the like.

According to the present disclosure, the surfactant 308 can include switchable surfactants capable of undergoing transformation from a neutral species to an ionic species in the presence of $CO_2$, cationic surfactants that form complimentary electrostatic interaction with negatively charged particles/proppants, switchable zwitterionic surfactants, anionic surfactants, nonionic surfactants, polyelectrolytes, ethoxylated glycerides, ethoxylated sorbitan esters, ethoxylated alcohols, ethoxylated castor oil, and derivatives of same.

The solid particles 310 can vary in size from about 0.5 nanometers to about 300 microns (300 µm). For instance, the solid particles 310 may be smaller than 100 mesh (149 µm), and in certain instances equal to or smaller than 200 mesh (74 µm), 230 mesh (63 µm) or even 325 mesh (44 µm). The rheology of the treating fluid is controllable by varying the size ratio between the solid particles 310 and the dispersed fluid 304. For instance, the ratio of the dispersed fluid to the solid particles 310 can be from about 1:1 to about 10,000,000:1, and typically about 100:1. By varying the size of the solid particles 310 and/or the dispersed fluid 304, the treating fluid can be made more or less viscous. Thus, the rheology is tuned, at least in part, by selecting different particle sizes and not purely through chemical manipulation of the fluid (e.g., by adding friction reducers and gelling agents).

A sample of a treating fluid according to the present disclosure was prepared and tested. Fracturing fluid formulated at 35 # loading, to which 1 gram of solid particles were added along with Canola oil. As a control, 1 gram of solid particles were added to another fracturing fluid which did not contain Canola oil. The two mixtures were agitated in a blender so that homogeneous solutions were obtained. The mixtures were allowed to sit for 30 minutes. At that point, the two solutions were examined. After 30 minutes, there was only a minimal layer of settlement (less than half of a millimeter) observed in the fluid containing the Canola oil and the opacity was similar to that of other colloidal suspensions (e.g., milk). In contrast, the suspension without Canola oil displayed over a millimeter of settlement. Based on the degree of visible settling after 30 minutes, it was evident that the particle-stabilized emulsion (including solid particles and Canola oil) facilitated better suspension of the solid particles in the fluid.

In addition to the embodiments described above, many examples of specific combinations are within the scope of the disclosure, some of which are detailed below:

EXAMPLE 1

A treatment fluid for treating a subterranean formation, the treatment fluid comprising:
a continuous fluid phase;
a dispersed fluid phase dispersed throughout the continuous fluid phase; and
a plurality of solid particles adsorbed to an interface between the continuous and dispersed liquid phases thereby stabilizing the dispersed fluid phase in the continuous fluid phase.

EXAMPLE 2

The treatment fluid of Example 1, the dispersed fluid phase comprising oil and the continuous fluid phase comprising water.

EXAMPLE 3

The treatment fluid of Example 2, wherein the water comprises salt.

EXAMPLE 4

The treatment fluid of Example 1, the dispersed fluid phase comprising additives.

EXAMPLE 5

The treatment fluid of Example 4, the additives being at least one of a friction reducer, a biocide, a scale inhibitor, a corrosion inhibitor, an acid, and a crosslinking agent.

EXAMPLE 6

The treatment fluid of Example 1, further comprising a surfactant being at least one of switchable surfactants, cationic surfactants, switchable zwitterionic surfactants, anionic surfactants, nonionic surfactants, polyelectrolytes, ethoxylated glyceride, ethoxylated sorbitan ester, ethoxylated alcohol, ethoxylated castor oil, and derivatives thereof.

EXAMPLE 7

The treatment fluid of Example 1, the plurality of solid particles being at least one of mica, silica, titanium, crystalline nanocellulose, colloidal borosilicate, colloidal zirconium oxide, colloidal aluminum oxide, microgels, food-based particulates, carbon nanotube particles, carbon nanofiber and carbon nanobeads, and polymer micro beads.

EXAMPLE 8

The treatment fluid of Example 1, wherein the continuous and dispersed fluid phases form a particle-stabilized emulsion.

EXAMPLE 9

The treatment fluid of Example 8, wherein the plurality of solid particles stabilize the emulsion.

EXAMPLE 10

The treatment fluid of Example 1, wherein rheology of the treatment fluid is related to the size of each of the plurality of solid particles.

EXAMPLE 11

A method for treating a subterranean formation comprising:
  providing a treating fluid comprising a continuous fluid phase and a dispersed fluid phase dispersed throughout the continuous fluid phase, and a plurality of solid particles adsorbed to an interface between the continuous and dispersed fluid phases, thereby stabilizing the continuous and dispersed fluid phases; and
  pumping the treating fluid under pressure via a pump to invert the emulsion so that at least a portion of the solid particles are deposited in the subterranean formation.

EXAMPLE 12

The method of Example 11, further comprising tuning a viscosity of the treating fluid by adjusting the size of the solid particles.

EXAMPLE 13

The method of Example 11, further comprising forming a particle-stabilized emulsion comprising the continuous and dispersed fluid phases.

EXAMPLE 14

The treatment fluid of Example 13, further comprising stabilizing the emulsion with the plurality of solid particles.

EXAMPLE 15

The treatment fluid of Example 14, further comprising inverting the particle-stabilized emulsion by pumping the treating fluid under pressure via a pump.

EXAMPLE 16

The method of Example 11, wherein the dispersed fluid phase comprises at least one of a friction reducer, a biocide, a scale inhibitor, a corrosion inhibitor, an acid, and a crosslinking agent.

EXAMPLE 17

The method of Example 11, the treating fluid further comprising a surfactant being at least one of switchable surfactants, cationic surfactants, switchable zwitterionic surfactants, anionic surfactants, nonionic surfactants, polyelectrolytes, ethoxylated glyceride, ethoxylated sorbitan ester, ethoxylated alcohol, ethoxylated castor oil, and derivatives thereof.

EXAMPLE 18

The method of Example 11, wherein the plurality of solid particles comprises at least one of mica, silica, titanium, crystalline nanocellulose, colloidal borosilicate, colloidal zirconium oxide, colloidal aluminum oxide, microgels, food-based particulates, carbon nanotube particles, carbon nanofiber and carbon nanobeads, and polymer micro beads.

EXAMPLE 19

A method for preparing a treatment fluid for treating a subterranean formation, comprising:
  providing a continuous fluid phase; and
  mixing a dispersed fluid phase in the continuous fluid phase in the presence of a plurality of solid particles to produce a plurality of particle-stabilized emulsion particles comprising the dispersed fluid phase dispersed throughout the continuous fluid phase, wherein at least a portion of the solid particles adsorbed to an interface between the dispersed fluid phase and the continuous fluid phase.

EXAMPLE 20

The method of Example 19, further comprising carrying additives in the dispersed phase.

This discussion is directed to various embodiments of the present disclosure. The drawing figure is not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout this description and claims to refer to particular features or components. As one skilled in the art will appreciate, different persons may refer to the same feature or component by different names. This document does not intend to distinguish between components or features that differ in name but are the same structure or function. The drawing figure is not necessarily to scale. Certain features and components herein may be shown exaggerated in scale or in somewhat schematic form and some details of conventional elements may not be shown in interest of clarity and conciseness.

In this discussion and in the claims, the terms "including" and "comprising" are used in an open-ended fashion, and thus should be interpreted to mean "including, but not limited to . . . ."

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

We claim:

1. A treatment fluid for treating a subterranean formation, the treatment fluid comprising:
   a continuous fluid phase;
   a dispersed fluid phase dispersed throughout the continuous fluid phase; and
   a plurality of proppant particles adsorbed to an interface between the continuous and dispersed fluid phases thereby stabilizing the dispersed fluid phase in the continuous fluid phase to form a particle-stabilized emulsion, and the proppant particles are sized to hold open a fracture in the formation and comprise a particle size between 0.5 nanometers and 300 microns.

2. The treatment fluid of claim 1, the dispersed fluid phase comprising oil and the continuous fluid phase comprising water.

3. The treatment fluid of claim 2, wherein the water comprises salt.

4. The treatment fluid of claim 1, the dispersed fluid phase comprising additives.

5. The treatment fluid of claim 4, the additives being at least one of a friction reducer, a biocide, a scale inhibitor, a corrosion inhibitor, an acid, and a crosslinking agent.

6. The treatment fluid of claim 1, further comprising a surfactant being at least one of switchable surfactants, cationic surfactants, switchable zwitterionic surfactants, anionic surfactants, nonionic surfactants, polyelectrolytes, ethoxylated glyceride, ethoxylated sorbitan ester, ethoxylated alcohol, ethoxylated castor oil, and derivatives thereof.

7. The treatment fluid of claim 1, the plurality of proppant particles being at least one of mica, silica, titanium, crystalline nanocellulose, colloidal borosilicate, colloidal zirconium oxide, colloidal aluminum oxide, microgels, food-based particulates, carbon nanotube particles, carbon nanofiber and carbon nanobeads, and polymer micro beads.

8. The treatment fluid of claim 1, wherein rheology of the treatment fluid is related to the size of each of the plurality of proppant particles.

9. A method for treating a subterranean formation comprising:
   providing a treating fluid comprising a continuous fluid phase and a dispersed fluid phase dispersed throughout the continuous fluid phase, and a plurality of proppant particles adsorbed to an interface between the continuous and dispersed fluid phases, thereby stabilizing the continuous and dispersed fluid phases forming a particle-stabilized emulsion, and the proppant particles are sized to hold open a fracture in the formation and comprise a particle size between 0.5 nanometers and 300 microns; and
   pumping the treating fluid under pressure via a pump to invert the emulsion so that at least a portion of the solid particles are deposited in the subterranean formation.

10. The method of claim 9, further comprising tuning a viscosity of the treating fluid by adjusting the size of the proppant particles.

11. The treatment fluid of claim 9, further comprising inverting the particle-stabilized emulsion by pumping the treating fluid under pressure via a pump.

12. The method of claim 9, wherein the dispersed fluid phase comprises at least one of a friction reducer, a biocide, a scale inhibitor, a corrosion inhibitor, an acid, and a crosslinking agent.

13. The method of claim 9, the treating fluid further comprising a surfactant being at least one of switchable surfactants, cationic surfactants, switchable zwitterionic surfactants, anionic surfactants, nonionic surfactants, polyelectrolytes, ethoxylated glyceride, ethoxylated sorbitan ester, ethoxylated alcohol, ethoxylated castor oil, and derivatives thereof.

14. The method of claim 9, wherein the plurality of proppant particles comprises at least one of mica, silica, titanium, crystalline nanocellulose, colloidal borosilicate, colloidal zirconium oxide, colloidal aluminum oxide, microgels, food-based particulates, carbon nanotube particles, carbon nanofiber and carbon nanobeads, and polymer micro beads.

15. A method for preparing a treatment fluid for treating a subterranean formation, comprising:
   providing a continuous fluid phase; and
   mixing a dispersed fluid phase in the continuous fluid phase in the presence of a plurality of proppant particles to produce a plurality of particle-stabilized emulsion particles comprising the dispersed fluid phase dispersed throughout the continuous fluid phase, wherein at least a portion of the proppant particles adsorbed to an interface between the dispersed fluid phase and the continuous fluid phase, and the proppant particles are sized to hold open a fracture in the formation and comprise a particle size between 0.5 nanometers and 300 microns.

16. The method of claim 15, further comprising carrying additives in the dispersed fluid phase.

* * * * *